Oct. 20, 1925.  
C. H. WHITE  
DISK HARROW  
Original Filed July 7, 1919   2 Sheets-Sheet 1
1,558,132
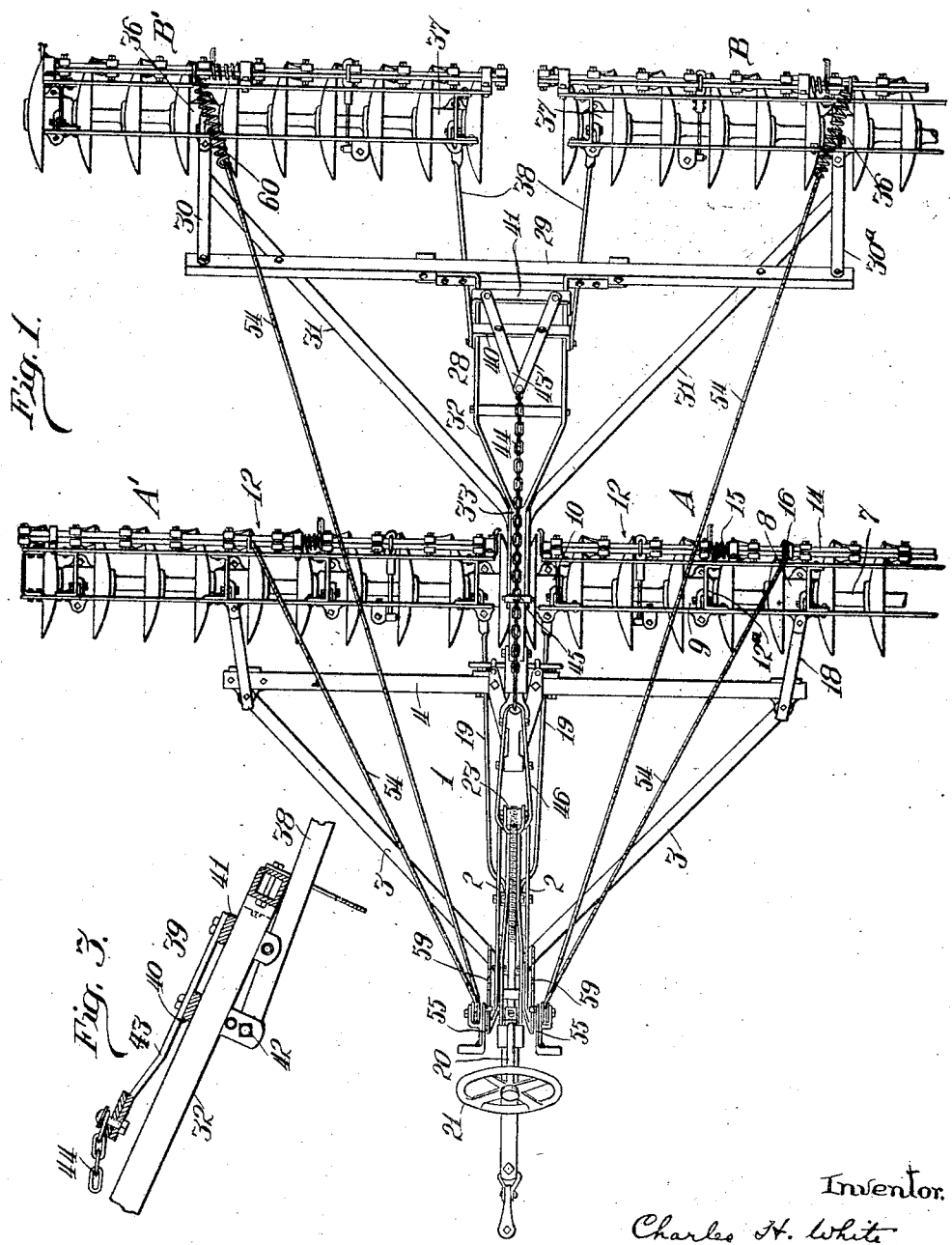

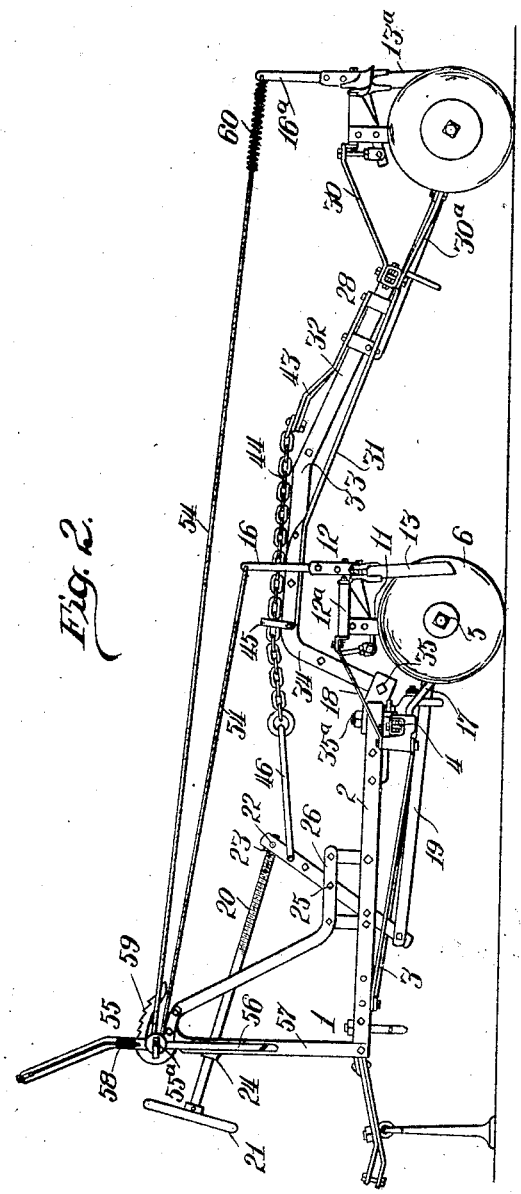

Patented Oct. 20, 1925.

1,558,132

UNITED STATES PATENT OFFICE.

CHARLES H. WHITE, OF MOLINE, ILLINOIS, ASSIGNOR TO DEERE & COMPANY, OF MOLINE, ILLINOIS, A CORPORATION OF ILLINOIS.

DISK HARROW.

Original application filed July 7, 1919, Serial No. 309,008. Divided and this application filed May 27, 1925. Serial No. 33,097.

*To all whom it may concern:*

Be it known that I, CHARLES H. WHITE, a citizen of the United States, and a resident of Moline, in the county of Rock Island and State of Illinois, have invented certain new and useful Improvements in Disk Harrows, of which the following is a specification, reference being had to the accompanying drawings.

My invention relates to disk harrows of the tandem type, comprising a front or draft frame and a rear laterally swinging frame flexibly connected to the front frame or draft devices, each of said frames having disk gangs connected therewith so as to be adjustably movable in relation thereto. It is more particularly designed for use with such disk harrows adapted to be drawn by a tractor and provided with gang adjusting means operable from the front of the harrow to angularly adjust the gangs of the front and rear units or sections, and preferably having a rear gang connection of such character that lateral swinging of the rear harrow unit relatively to the front unit will not affect the setting of the rear gangs, or in other words, such that the rear frame may swing laterally relatively to the front frame without incidentally causing the rear gangs to move angularly relatively to each other. A disk harrow of this type is fully shown and described in my pending application, Serial No. 309,008, filed July 7, 1919, of which this application is a division. The object of my present invention is to provide a disk cleaning or scraping mechanism for the disks of a front gang and those of the gang in rear thereof of a harrow of the tandem type, and also to provide means for adjusting the scraper mechanisms of both, such that similar movements will be imparted thereto at all times irrespective of the lateral swinging movements of the rear unit.

In the drawings,—

Fig. 1 is a top plan view of a disk harrow mechanism embodying my improvements;

Fig. 2 is a side elevation; and

Fig. 3 is a view on an enlarged scale partly in section, partly in side elevation, of some of the parts for transmitting power to the rear gangs for adjusting them.

In the embodiment of my invention illustrated in the drawings, a main frame or front frame 1 is formed of central longitudinal bars 2, inclined side bars 3, 3, and a cross-bar 4; these bars being preferably of wrought metal, and the frame, as an entirety, being substantially similar to some of those now in use.

Immediately behind this frame is mounted a front harrow unit comprising two disk gangs A, A¹. These also may be of any preferred construction suitable for the purposes of this mechanism. As shown, each gang comprises a central shaft 5, concavo-convex disks 6 and disk-spacing and bracing thimble tubes 7. Each thimble has radially expanded bosses at its ends to provide a wide engagement with the central portion of the disk. At the inner end of the gang, immediately inside of the innermost disk, there is a large boss adapted to abut against that on the opposite gang for taking the inward endwise thrust. Each gang, as shown, has three boxes at 8, 9 and 10. From these boxes there rise up standards 11 which support a super-adjacent frame 12ª. This frame supports a scraper system indicated as an entirety by 12 comprising a series of scrapers 13, one for the concave side of each disk, a scraper-carrying rod or bar 14 held, longitudinally, in normal position by a spring 15, and a lever 16.

Each gang of the front unit is attached to the frame 1 by a lower pivoted link 17, and an upper link 18. These links allow endwise movement outward and inward of the gangs. These links 17, 18 are connected to the outermost boxes 8 of the gang axle systems. The inner boxes 10 are also connected to the front frame by adjustable drag bars 19.

The apparatus shown may be drawn by an engine or tractor, and in such case the operator rides on the platform at the rear end of the engine and the harrow mechanism is provided with devices by which the operator can exert considerable power in adjusting the gangs. When the latter are in alignment the disks are inactive in respect to engaging with, and forming furrows in, the soil, they, at such time, merely rolling as wheels on the surface for supporting the parts carried by them. When the disks are to be put in operation each front gang must be thrown back at its inner end in order to turn forward the concave sides of the disks. The greater the angles to the line of draft of the planes of the cutting edges of the disks, the more efficiently will the latter engage with the soil, and the greater will be the resistance to the forward movement.

To vary the angle of the gangs, use is made of a screw rod 20 having a hand wheel 21 accessible to the operator on the engine platform. This rod is connected with the upper end of a lever 22 by a nut 23 engaging with the rod and swiveled in the lever 22. At 24 there is a swiveled sleeve supporting the forward end of the rod 20 and permitting its ends to swing vertically. The lever 22 is at 25 pivoted to the frame 1 or to a supplemental support 26 secured to this frame. The lower end of the lever 22 is pivotally connected to the draw bars 19 of the front gangs.

When the operator desires to have the inner ends of the gangs of the front unit move backward to operative positions, he rotates the screw rod in such way as to permit the links 19 to move longitudinally rearward. But little force is required to move the inner ends of the gangs backward inasmuch as the governing link connections at 17, 18 of each gang system are positioned nearer to the outer ends of the gangs than to the inner ends. As soon as the gangs begin to turn, the greater earth resistance at the inner ends causes the latter to swing backward. However, if power is required for this, it can be readily applied by the operator through the screw rod, and, on the other hand, when he desires to bring the gangs to transverse alignment, the resistance of the soil is overcome by means of the powerful power transmitting devices which I have provided. No ratchets or locking dogs are required for holding the gangs at any predetermined angle, the thread and nut at 23 being self-locking at any position to which the rod may be used.

To that part of the apparatus above described is connected the rear harrow unit. It comprises the disk gangs B, B¹, each of which is approximately a duplicate of the front gangs A, A¹, except that the rear gangs are in reversed position; that is to say, are so arranged that their disks have their concave faces turned inward and their convex faces turned outward.

These rear gangs are supported and drawn by a frame 27 comprising a central longitudinally disposed part 28, cross-bar 29, end bars 30, and 30ᵃ, and the forwardly extending and converging brace bars 31. The central frame member 28 is formed of longitudinal bars 32, which, at their rear ends, are inclined downward, the central parts 33 being in horizontal planes somewhat above the front disk frames, and the forward ends 34 extending downward to their point of attachment to the front frame 1. The front parts of these bars and the elevated horizontal parts 33 are close together to form a rigid connecting arm 34, while the rear parts at 32 are spread apart, as shown in Fig. 1, to provide a light expanded frame element. The connecting arm 34 is connected to the front frame 1 by a coupling 35 and a substantially vertical pivot 35ᵃ to freely swing, bodily, toward the right or toward the left, independently, more or less, of the gangs A, Aᵃ of the front unit. Such freedom of relative swing is necessary both when the apparatus as a whole is being turned at the end of a transit across the field, and also at times during a traverse in correspondence with variations in the surface of the soil. Generally, however, the four gang elements are, when in operation, positioned similarly in respect to the central vertical longitudinal plane through this mechanism. The gangs B, B¹ are pivotally connected to the end bars 30 and 30ᵃ of the rear frame, the pivots joining the bars to bearing boxes 36. The inner end boxes 37 of the rear gangs are held by pivoted drag bars or links 38 which extend forward to their adjusting devices. The latter comprise a sliding frame at 39 having transverse bars 40, 41, riding slidably on the frame bars 32. The cross-bar 40 is at 42 pivoted to the drag bars 38 of the rear gangs. The bars 40, 41 are bound together and braced by short inclined bars 43. To the forward ends of these brace bars 43 is connected a chain 44 which extends forward over the top of the forward portion of the rear frame to and through a loop guide 45 carried by the front bar part 33, 34 of the frame and situated in or close to the vertical axis of the pivot or hinge 35ᵃ. The chain extends forward beyond this loop guide 45 and at a point that is substantially in line with the vertical axis of the pivot 35ᵃ it is flexibly connected to a link 46 that is connected with the aforesaid lever 22. By providing a connection between the angling devices on the rear frame and the actuating means therefor on the front frame that is flexible laterally at a point substantially in line with the vertical axis of the pivot 35ᵃ, the rear unit may swing laterally relatively to the front unit without incidentally causing an angular movement of the rear gangs with relation to each other, as hereinafter further explained. The connection of the chain with the lever 22 is at a point higher than the pivot 25 of said lever, and therefore when the operator by means of the screw rod 20 and hand wheel 21 swings the upper end of lever 22 forward (as he does when swinging the inner ends of the front gangs rearward) he draws forward on the chain 44 and on the rear drag bars 38 and swings the inner ends of the rear gangs B, B¹ forward. And, conversely, when he rotates the screw rod 20 in the opposite direction and draws the inner ends of the front gangs A, A¹ forward toward alignment he moves the lever 22 at its upper end backward and this permits the strain from the earth on the rear disks to cause the rearward swinging of the inner ends of the rear gangs.

If the parts be properly constructed and related and the proper points be selected for pivoting the gangs of the front system and the gangs of the rear system, there will be, approximately, a compensation in respect to the resistance to be overcome in moving the inner ends. The inner ends of the front and rear gangs move oppositely. The earth's resistance tends to swing the inner ends of the front gangs backward and the force coming from this is utilized to draw the inner ends of the rear gangs forward; and vice versa; so that there is but little increase of resistance for the operator to overcome when actuating the screw rod 20.

The chain abutment or guide 45 being, as stated, in or near the vertical line of the axis around which the rear frame swings, and the chain being laterally flexible substantially over or in line with the axis of the vertical pivot 35ª, the chain and the attachments at its ends are, as a system, divided into two parts, each having a substantially fixed length, one part extending from the abutment or guide 45 to the lever 22 and the other extending from the abutment 45 to the innermost bearings of the rear gang axles. This provides for swinging the rear frame and the rear gangs to the right or to the left around their main vertical hinge without having any substantial variations in the tension on the chain and its attachments, and therefore the rear gangs remain fixed at the angles to which they are set by the operator through the rod 20 and the lever 22.

Coming now to the scrapers and the adjusting devices therefor which constitute the immediate subject-matter of this application,—as will hereinafter appear, I have provided devices for effecting the scraping of all of the disks simultaneously of both of the right hand gangs; and also of the disks of the left hand gangs.

Each of the aforesaid scraper levers 16 for actuating the scrapers of a front gang is connected by a cable or similar power transmitting device 54 to the scraper-actuating lever 16ª of the gang immediately behind it. This cable is extended forward and supported on a bodily adjustable carrier 55. As shown, this is a pulley 55ª mounted on a manually operated device in the form of a lever 56 pivoted to the standard or upright frame 57 rising from the front end of the main frame 1. The lever has a detent 58 engaging with a lock segment 59.

When the operator desires to effect the scraping of all the disks of, for example, the right hand gangs, he releases detent 58, and, by lever 56, moves the pulley or support 55, and through the cable 54 and the levers 16, 16ª moves the scrapers 13, 13ª, simultaneously, to their operative positions in relation to their respective disks. The levers 16, 16ª are position as closely as possible to the vertical axes around which the gang systems swing horizontally, and consequently the ends of the cable have a minimum of displacement from the points where the drafts on the two strands of the cable are maintained at a balance. The inner ends of the gang systems can, when the front and rear systems are in parallel, be independently angulated without materially varying the lengths of the courses of the cable extending from the pulley 55 to the scraper levers. And the rear frame and its gangs can swing within the ordinary range independently of the front gangs without materially modifying the relationships of the cable courses. To compensate for such slight variation as may occur, I insert into the line of the cable a coil spring 60 of proper tension to yield, when occasion demands, and also to take up such slack as exists.

There are two of the scraper adjusting cable systems, one for the right hand gangs and one for those at the left; and they are substantially duplicates of each other. At many times the disks on one side of the central plane will be contacting with dry non-sticky soil that does not adhere to the surfaces or impede their operations, while, at the same time, the disks on the other half of the mechanism will be in muddy or sticky earth, or will be contacting with the stems or stocks of grasses and weeds of the wiry class which refuse to be cut by the disks and form mats around the peripheries. At such times the operator is not called upon to perform the severe work of throwing all of the scrapers to active positions as, with the devices described, he can cause the cleaning of the convex surfaces or of the cutting edges of one set independently of the others.

It will be understood that my improved scraper adjusting devices may be applied to tandem disk harrows other than that selected for illustration, as shown for example in my pending application, Serial No. 315,088, filed August 4, 1919, and the claims hereinafter made are therefore to be construed accordingly.

What I claim as my invention and desire to secure by Letters Patent, is—

1. The combination of a front disk gang, a disk gang in rear thereof, each of said gangs being movable relatively to the lines of draft independently of the other and comprising a gang frame, a set of disks, a set of disk scrapers and a device for moving the said scrapers, a frame connected to both of said gangs, a manually operated device on the frame and a power transmitting device extending from the said manually operated device to both of said scraper holding devices and adapted to transmit thereto similar movements irrespective of the relative positions of the gangs.

2. The combination of a front disk gang, a disk gang in the rear thereof, a frame, each of said gangs being connected to the frame by a hingelike union having an approximately vertical axis, and each comprising a gang frame, a set of disks, a set of disk scrapers, and a device for moving the scrapers positioned at a point near the line of the vertical axis of the gang, a manually operated device on the frame, and power transmitting means extending from the said manually operated device to both of the scraper moving devices to operate them simultaneously.

3. The combination of a front disk gang, a disk gang in the rear thereof, a draft frame, each of said gangs being adjustably connected to the said frame and comprising a gang frame, a set of disks, a set of disk scrapers, and a device for moving the said scrapers, a manually operated device, a cable connected to each of the scraper moving devices and having the part intermediate of the connections arranged to loosely engage with the said manually operated device to permit automatic variations in the lengths of the end portions secured to the scraper movers.

4. The combination of a front disk gang, a disk gang in the rear thereof, a draft frame, each of the said gangs being adjustably connected to the said frame and comprising a gang frame, a set of disks, scraper mechanism for the disks, and a device for moving the scraper mechanism, a manually operated device including a movable cable guide, and a cable connected to both of the said scraper moving devices and having the part intermediate of the connections arranged to engage loosely with the said movable cable guide.

5. In a tandem disk harrow comprising front and rear harrow units pivotally coupled to swing laterally relatively to each other, each of said units having disk gangs adjustable angularly relatively to the line of draft, the combination with scrapers associated with the disks of said gangs respectively, of scraper adjusting means mounted on the front unit and operable to impart substantially similar movements to the scrapers of the front and rear gangs irrespective of the angular positions of said gangs.

CHARLES H. WHITE.